United States Patent [19]

Murphy

[11] Patent Number: 5,530,342

[45] Date of Patent: Jun. 25, 1996

[54] MICROMACHINED RATE SENSOR COMB DRIVE DEVICE AND METHOD

[75] Inventor: Hugh J. Murphy, Placentia, Calif.

[73] Assignee: Rockwell International Corporation, Seal Beach, Calif.

[21] Appl. No.: 315,471

[22] Filed: Sep. 30, 1994

[51] Int. Cl.$^6$ ..................... G01P 9/04
[52] U.S. Cl. ..................... 324/158.1
[58] Field of Search ............ 73/505, 510, 517 AV; 324/158.1, 772

[56] References Cited

U.S. PATENT DOCUMENTS

| | | | |
|---|---|---|---|
| 4,884,446 | 12/1989 | Ljung | 73/505 |
| 5,095,263 | 3/1992 | Peters | 324/166 |
| 5,285,686 | 2/1994 | Peters | 73/504.15 |
| 5,349,855 | 9/1994 | Bernstein et al. | 73/505 |
| 5,383,362 | 1/1995 | Putty et al. | 73/505 |
| 5,392,650 | 2/1995 | O'Brien et al. | 73/505 |
| 5,408,877 | 4/1995 | Greiff et al. | 73/505 |

*Primary Examiner*—Ernest F. Karlsen
*Assistant Examiner*—Russell M. Kobert
*Attorney, Agent, or Firm*—George A. Montanye; David J. Arthur; Susie H. Oh

[57] ABSTRACT

A micromachined rate sensor system includes plural sensing proof masses or plates coupled to multiple electrostatic combs. A comb drive amplifier induces a deflection of the sense plates along a plane defined by the configuration of the sense plates, such that the sensed rotational rate causes an out-of-plane force to act on the sense plates. The motor combs are driven at half NRF by coupling a comb drive amplifier to a half frequency motor oscillator comprising a digital "divide by 2" flip flop, a low pass filter, a multiplier, and a plurality of signal amplifiers. The half frequency oscillator provides the drive voltage at one-half the NRF. Accordingly, embodiments of the present invention eliminate undesirable parasitic drive feedthrough at the motor frequency, thus providing for increased efficiency.

12 Claims, 4 Drawing Sheets

MICROMACHINED RATE SENSOR COMB DRIVE DEVICE AND METHOD

BACKGROUND OF THE INVENTION

1. Field of the Invention

The present invention relates to minimizing the effects of parasitic drive voltage on a rate sensor and, more particularly, to a simple and efficient device and method for accurately sensing motor motion and rotation rates.

2. Description of the Related Art

Micromachined silicon rate sensors are expected to provide tremendous cost and size advantages over many competing technologies. Micromachined rate sensors are typically single crystal silicon "resonating structure" gyros that are rugged, inherently balanced, physically small, and inexpensive to fabricate. Using batch processing techniques that are typical in today's semiconductor industry, thousands of identical sensors, each less than a few square millimeters in area, can be fabricated simultaneously. The utilization of micromachining process technology provides a major advantage of size and cost over existing macroscopic devices. Small micromechanical gyro chips capitalize on the inherent low costs associated with silicon wafer fabrication techniques while providing sensitivity and ruggedness suitable for many uses, such as in automobiles.

A rate sensing gyro (RSG) is analogous to an undamped spring-mass mechanical system. In broad terms, the principle of operation uses a resonating structure device that, under initial excitation, will induce a velocity in the structure sensing masses, e.g., proof masses. The proof masses will oscillate at the natural resonance frequency (NRF) of the spring-mass system when excited. This oscillation can be maintained by an external amplification circuit which feeds back energy at the correct frequency and phase to replace any losses attributable to the mechanical structure. When an angular rate is applied to the oscillating system, comprised of the proof masses coupled to springs, a corresponding force is induced on the masses which is very linearly proportional to the magnitude of the applied angular rate. This force can then be applied to produce an electrical signal which may be calibrated and which serves as a rate indicator.

Electrostatic combs may be utilized to drive the masses with oscillatory signals. Small changes in the motion of the vibrating masses occur when the device is rotated about a sense axis. The sense axis is parallel to the plane in which the masses move, and normal to their velocities. The Coriolis effect causes the masses to oscillate slightly out of their original plane of motion, by an amount proportional to the rotation rate. Coriolis forces have been described as forces that act orthogonally (at 90 degrees) to the motion of the masses. Accordingly, measurement of the mass deflection allows the determination of the rotational rate.

Low cost rate sensors, however, have not been without certain disadvantages. It has been found that one drawback in micromachining technology is that it is often difficult to extract accurate voltage signals representing the sensed rates. To measure such small signals, complicated and extremely sensitive electronics are typically necessary. However, undesirable parasitic feedthrough of the drive voltage signal into the processing electronics tends to affect the output sense signal, distorting the signal by the amount of the drive signal. This parasitic drive voltage exists due to imperfections in the sensor manufacturing and electronics operations and process, whereby a capacitive coupling mechanism couples the drive voltage directly to the motor position output signal and the sensed rate signal.

The two coupling arrangements act as error sources. Drive voltage is orthogonal to motor position, and drive voltage coupling to motor position causes a rotation in phase with the motor position signal. However determination of the correct phase of the motor position is critical to signal processing of the sensed rate. In addition, drive voltage is in phase with sensed rate, such that coupling of the drive voltage into the rate sense pickoff induces a false rate "bias." This false bias adds an error term which is very large compared to angular rates that would ordinarily be sensed. Drive voltage-induced bias is typically a factor of 100 greater than the desirable full range of actual sensed rate.

For example, the sensor sense axis produces a charge signal that is proportional to the sensed rate. Typically, the rate sensor output magnitude of charge is on the order of $6 \times 10^{-18}$ coulombs per degree per second of sensed rate. This signal is very small and, when converted to voltage, becomes indistinguishable from noise for small sensed rates. Thus, because the sensed signal tends to be adversely affected by the drive voltage pickup when the drive voltage is at the NRF of the masses, it becomes critical to limit parasitic capacitance or voltage which has been shown to be a source of noise amplification.

The problem of drive voltage feedthrough into the sensed rate has been addressed by frequency multiplexing the sensed rate and applied motion at the NRF. Frequency multiplexing has been accomplished by applying a separate frequency tone to the proof mass sense plates. Applied angular rate multiplies this tone to produce a sensed rate tone which is a product of the NRF applied tone and the applied rate. In addition, signal processing requires that the sensed signal be demodulated at the sensed tone and the NRF. This method effectively eliminates drive voltage feedthrough into the sense pickoff. However, the problem of undesirable coupling of the drive voltage into the sensed motor position is not eliminated.

More particularly, as shown in FIG. 1, a micromachine comb drive circuit 100 operates as a conventional oscillator. Upon initial power on, there is no oscillation. A certain amount of noise, however, is generated in the circuit, and is amplified around the loop comprised of amplifiers 112, 116, and 124. This noise component is attributable to flat white noise in which there is a component that is in phase with the NRF of the sensor which, in turn, causes that component of the signal to continue to grow without bound. The signal ultimately becomes bounded by the action of the multiplier 118, the low pass filter 120, and the automatic gain control element 122.

The signal amplified by amplifier 116 is detected by an RMS converter including multiplier 118 and low pass filter 120, which converts the signal to a DC voltage. The DC value is applied to one terminal of the automatic gain control device 122. Consequently, the signal originating from the amplifier 116 is fed forward to a compensator 110 and to another amplifier 124, and is input into the second terminal of the automatic gain control 122. The automatic gain control element 122 regulates the amplitude of oscillation to precisely control the amplitude of motion. The compensator performs the function of converting position to velocity to maintain the phase around the loop at zero to sustain oscillation.

Furthermore, another attempt to eliminate feedthrough includes incorporating multiple frequencies into the motor by utilizing the "square law" nature of conversion of the drive voltage into motor force. That is, drive voltage applied to the outer combs of the motor produces a force on the motor which is the square of applied voltage ($V^2$). When the applied force is the NRF plus a DC preload voltage component, the force becomes $(DC+NRF)^2$. This expands to $DC^2+2*DC*NRF+NRF^2$. It is recognized that the middle term "2*DC*NRF" produces force in the motor. One method for avoiding feedthrough at the NRF requires that the motor be driven with two additive frequency tones, neither of which is the NRF. However, when the tones are squared in the motor forcing transfer function, a force component which is at the NRF is produced. Thus, any drive voltage frequency tone at the NRF of the masses is eliminated.

As illustrated in FIG. 2, it can be seen that the operation of the multiple frequency oscillator is similar to the fundamental oscillator with the addition of a reference frequency 232. The second frequency may be an arbitrary value multiplied (at 224) with the NRF of the sensor and summed with the product at the summing amplifier 228. Accordingly, the signal is amplified, and the resultant signal is the product of the arbitrarily selected reference signal and the motor NRF summed with the reference frequency. The resultant signal is applied to the amplifier and, consequently, to the motor. The output of amplifier 230 is then amplified and regulated in the automatic gain control circuit 222, amplified at amplifier 212, and then applied to the sensor 214. The sensor 214 converts voltage to force which squares the applied force such that the resultant frequency is at the motor NRF.

In contrast with the device of FIG. 1, the two-frequency oscillator differs in the amplification and regulation loop with the addition of the multiplier 224, the summing amplifier 228, and the reference frequency 232. However, it has been found that the system efficiency is only one-fourth of that of the fundamental motor frequency oscillator. The two-frequency oscillator tends to generate undesirable intermodulation tones that are difficult to keep out of the signal processing electronics. These spurious tones are an undesirable by product of the two-frequency drive. The tones are degrading if they are coincident with a sensor "out of sense plane" mode. These sensor modes are unavoidable and rejection of sensors for modes coincident with spurious tones are typically expensive to screen, and tend to limit the product yield.

In addition, spurious tones can occur in the sensed rate output whenever they lie within the processing passband. This can occur by direct injection or can occur because they are aliased into the passband as a result of sensor rate processing. Filtering for unwanted tones, however, places an added burden on the sense processing circuitry. Thus, the drive circuitry tends to be more complicated and expensive than the fundamental motor drive oscillator. However, although the two-frequency oscillator may be less desirable in certain cases than the fundamental motor frequency oscillator, there may be instances where it is advantageous to use the two-frequency oscillator to conquer the application limiting problem of feedthrough.

Thus, it can be seen that although the methods described above solve some of the problems of parasitic drive voltage pickup, these methods accomplish this at the expense of complex modulating and demodulating circuitry or by spurious tone-producing summation methods that require summing amplifiers and multiplier a to extract the desired signals. Both of these methods require a considerable amount of circuitry which is difficult to efficiently implement in a low cost integrated circuit process.

SUMMARY OF THE INVENTION

Accordingly, it is an object of the present invention to provide a device and method for substantially minimizing the limiting effects of parasitic drive voltage feedthrough in a rate sensing system. In preferred embodiments, the present invention addresses the problem of sensor comb drive by minimizing parasitic drive voltage coupling at the drive motor NRF.

These and other objects are accomplished, according to an embodiment of the present invention, by a micromachined sensor comb drive device and method including plural sensing proof masses or plates coupled to multiple electrostatic combs. A comb drive amplifier induces motion of the sense plates along the plane of the plates, such that the sensed rotational rate causes an out-of-plane force to act on the sense plates. The comb drive amplifier is coupled to a half frequency motor oscillator comprising a digital "divide by 2" flip flop (FF), a wave shaping filter, a multiplier, and a plurality of signal amplifiers. The half frequency oscillator is provided in the feedback path of the sensor, and provides the drive voltage at one-half the NRF. Accordingly, embodiments of the present invention eliminate the parasitic drive feedthrough at the motor frequency, and provide for increased efficiency.

DETAILED DESCRIPTION OF THE INVENTION

The following description is of the best presently contemplated mode of carrying out the invention. In the accompanying drawings, like numerals designate like parts in the several figures. This description 1s made for the purpose of illustrating the general principles of embodiments of the invention and should not be taken in a limiting sense. The scope of the invention should be determined by reference to the accompanying claims.

Embodiments of the present invention compensate for and avoid the drawbacks associated with parasitic drive voltage at the NRF which can degrade sensor performance. By utilizing the simplicity of a fundamental drive circuit combined with a divide-by-2 flip flop, combs 340, 344, 346, and 342 may be driven at half the NRF of the motor to produce a force at twice the driving frequency. As a result, there is no drive voltage at the motor NRF, and half of the total input energy is transferred to usable drive energy. More particularly, it is a general principle of undamped systems that the drive force is proportional to the square of the drive voltage. Therefore, at half the NRF frequency, the force waveform is twice the frequency of the input voltage waveform, and half the applied force is converted to force at the NRF. The other half of the applied force is DC force and does not perform any useful function.

Figure 1:
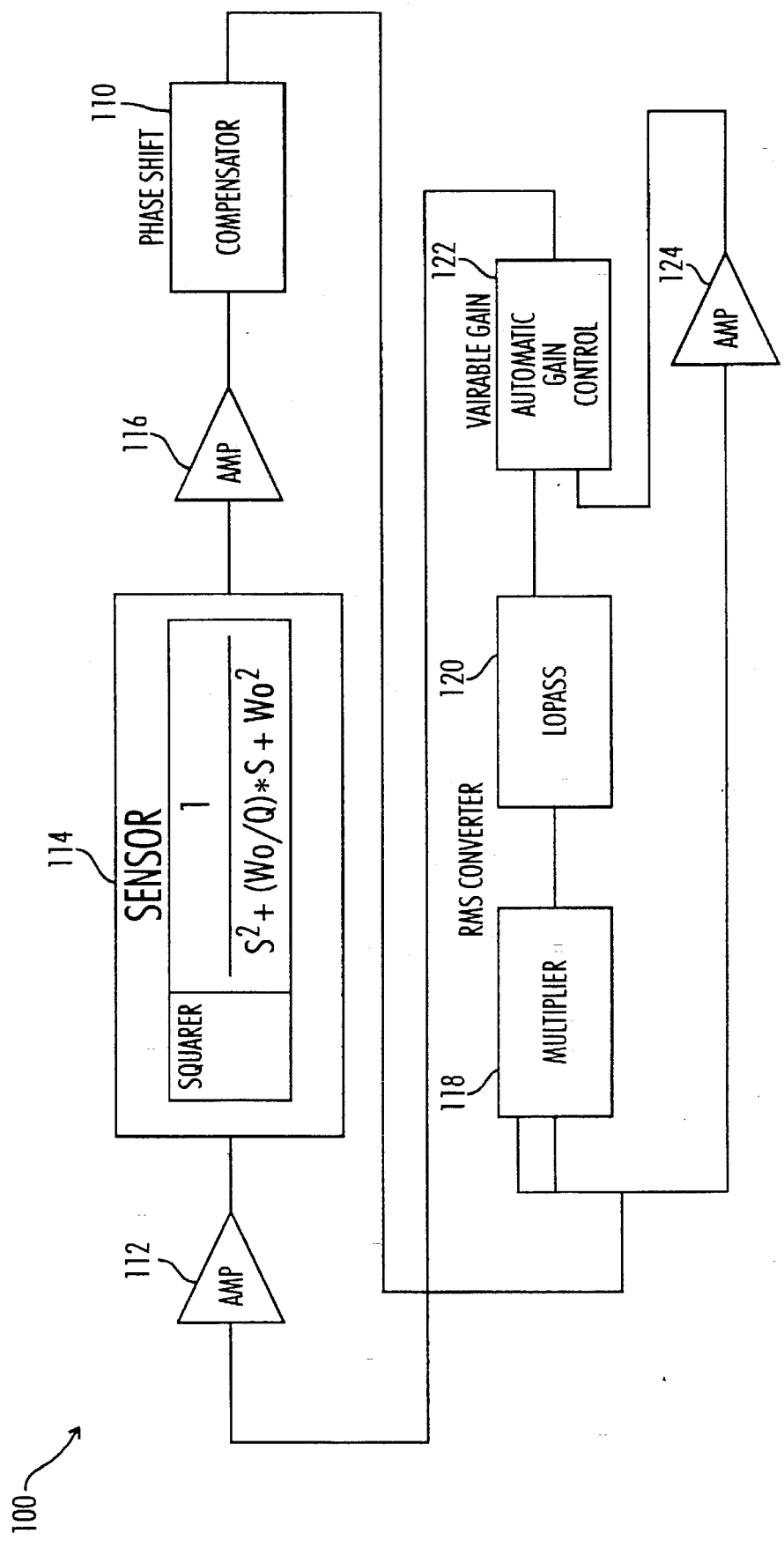
FIG. 1 is a block diagram of a prior art fundamental frequency oscillator.
Figure 2:
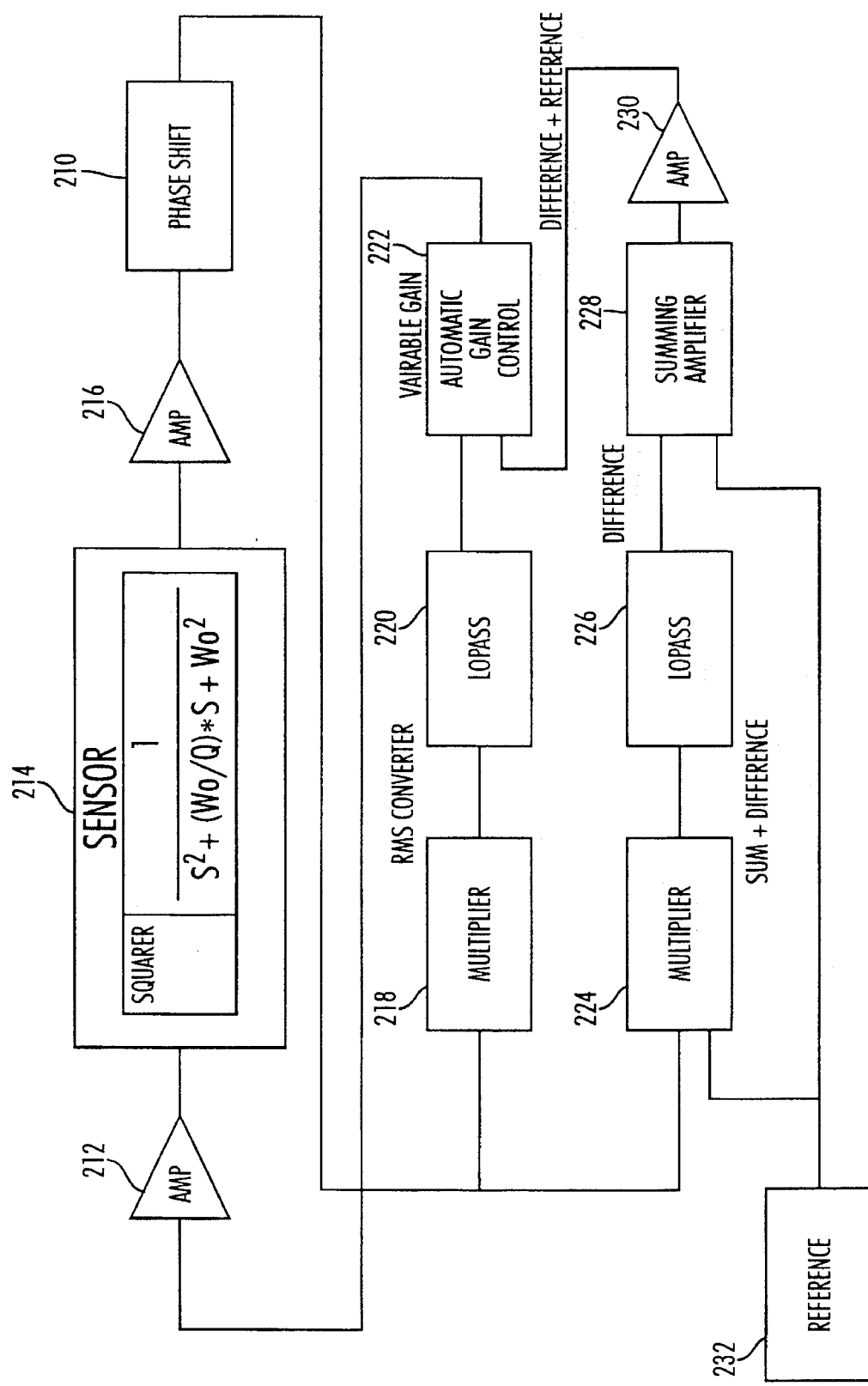
FIG. 2 is a block diagram of a prior art two frequency oscillator.
Figure 3:
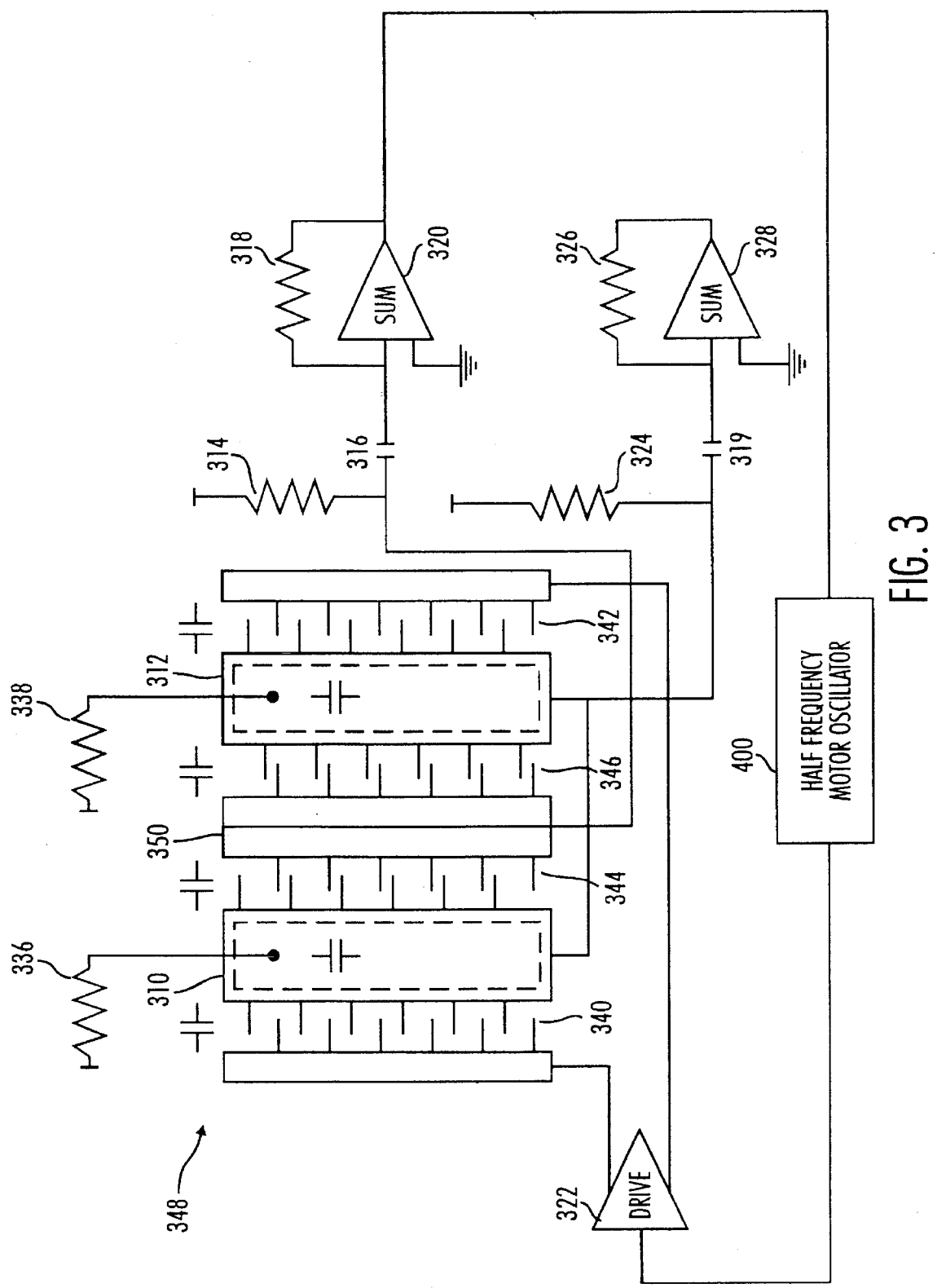
FIG. 3 is a component diagram of a micromachine sensor according to a preferred embodiment of the present invention.

An embodiment of a micromachined rate sensor is illustrated in FIG. 3. The rate sensor is provided with a plurality of combs 340, 342, 344, 346, which are coupled electrostatically to sense plates, or proof masses, 310 and 312. The combs and the proof masses are provided with overlapping tines. Generally, the sensor operates when the sense plates, or proof masses, 310 and 312 vibrate at the NRF of the motor, which comprises the combination of the drive combs and proof masses. By applying sufficient gain and phase in series with the proof masses so that the amplitude of noise grows around the natural resonance frequency of the motor, the motion of the proof masses can be sustained at a constant amplitude.

The proof masses are essentially capacitors and the coupling between the combs and the proof masses is analogous to an RLC inductive capacitor and resistor network. Sensed rotation rate causes an out-of-plane force to act on the proof masses, or sense plates, such that the plate capacitance, and, equivalently, the sense plate charge, is modulated at the drive frequency. The sense plate charge modulation is linearly proportional to the applied rate so that a rotation sense amplifier 328 can be coupled to the sense plates to convert the charge to voltage. Thus, the rotation sense amplifier 328 senses the changing capacitance on the sense plates 310 and 312. Essentially, the rotation sense amplifier 328 senses Coriolis motion in the motor which acts perpendicularly to the motion of the motor.

As shown in FIG. 3, the two combs 340 and 342 at the ends of the motor are driven by a comb drive amplifier 322. The amplifier 322 drives the combs 340 and 342 to produce resonant vibration. Motion in the motor is then sensed at pickoff element 350 by a high gain amplifier, called the motor position sense amplifier 320. The pickoff element 350, also known as the center motor, is comprised of the two center combs 344 and 346. The signal from the pickoff element 350 is input into the motor position sense amplifier 320 via capacitor 316.

The capacitor 316 blocks the DC voltage by its potential from the plates. The capacitors 316 and 319 block the bias voltages from entering and saturating the sense amplifiers 320 and 328. A bias resistor 314 is coupled between the capacitor 316 and ground to establish a charge on the capacitor 316 and apply a DC bias to element 350. Similarly, resistor 324 establishes a charge on capacitor 319, and supplies DC potential to the capacitive sense elements 310 and 312 to allow motion to be sensed in accordance with changes in charge. The charge amplifier signal is then processed within the half frequency oscillator, and fed to the comb drive 322. Motion of the sense plates, i.e., the proof mass motion perpendicular to the normal motion, inputs a charge into the charge amplifier 328. The charge is amplified to a corresponding voltage at the system NRF, which is the frequency of motion of the sense plates in the excited direction. The charge is then fed back to the amplifier input via resistor 326. The amplifier 328 performs the function of converting the electrical charge associated with the sensed rate, i.e., the Coriolis motion, to an electrical signal. This resultant converted sensed charge carries information at the NRF, or the sensor motor operating frequency. Baseband rate information is then extracted from this signal by demodulating the signal with a reference signal extracted from the motor motion signal at amplifier 320.

As explained above, due to the particular square law dependency of preferred embodiments of the sensor, the motor force is proportional to the voltage square. Likewise, the frequency of the motor position is equal to twice the driving frequency When driven at half frequency. Thus, if the sensor motor is driven at half the NRF, i.e., the voltage waveform is at half the NRF, the actual movement will be at the NRF since resonant structures can only react to the NRF. That is, because the sensor is not driven at the fundamental frequency, the drive voltage waveform is never at the fundamental frequency. Therefore, any coupling that may occur would be far outside the frequency bandwidth.

Thus, the voltage is free from the NRF drive voltage coupling. As explained above, rejection of the NRF drive voltage coupling is significant because, at this point, the drive voltage-induced signal would otherwise be indistinguishable from the sensed rate. Similarly, the signal is not confused with non-harmonically related spurious tones which could be interpreted as sensed rate.

Figure 4:
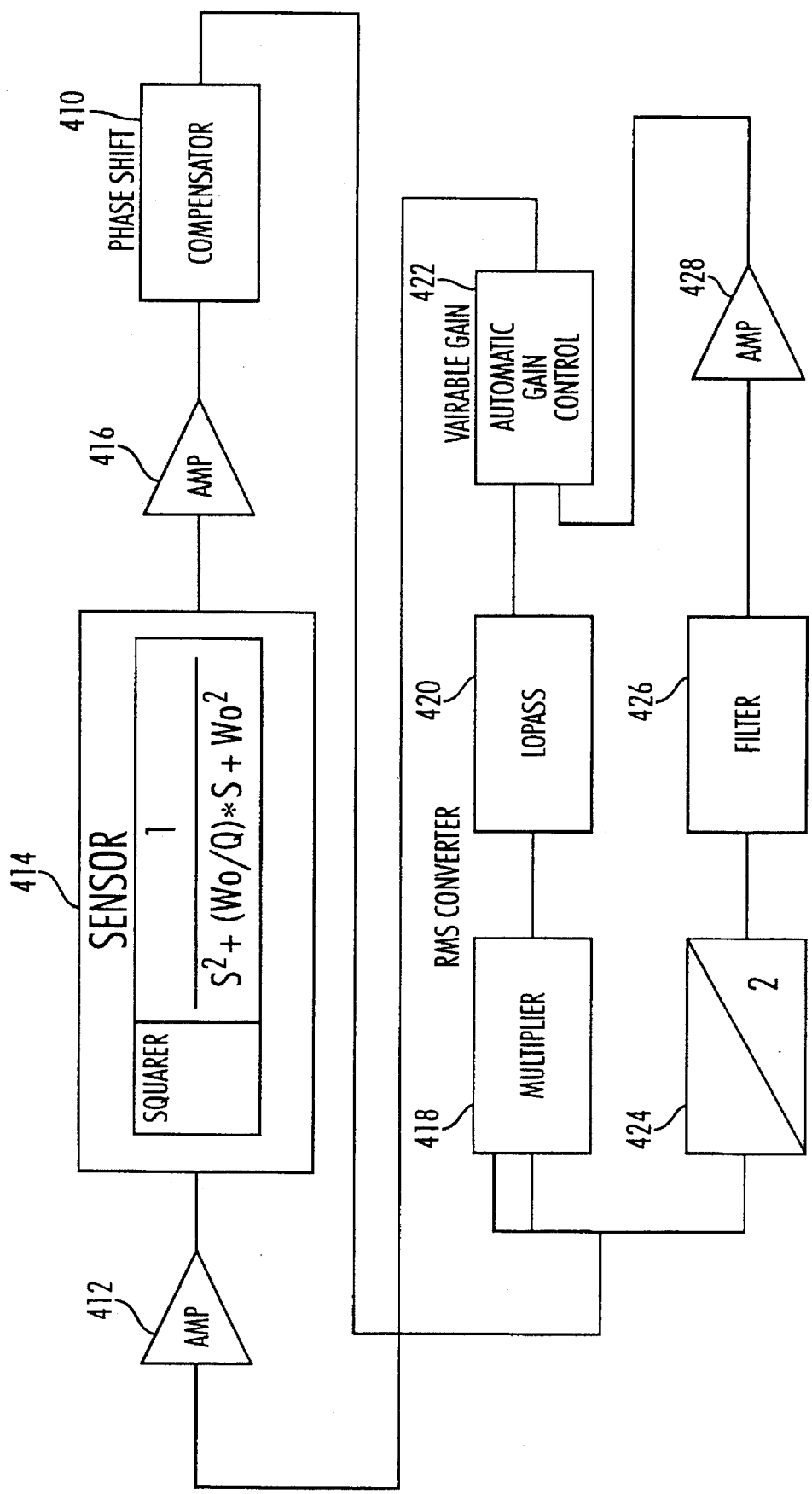
FIG. 4 is a block diagram of a half-frequency motor oscillator accordance with the sensor of FIG. 3.

Referring to FIG. 4, the amplifier 416 senses motor position, i.e., the plate capacitance, and converts the capacitance into a voltage. That voltage is amplified and phase compensated at compensator 410. The frequency of the motor motion is divided in half by a flip flop circuit 424 and shaped through filter 426. The filter signal is then amplified in amplifier 428, and applied to an automatic gain element 422. The reference for the automatic gain element is established by detecting the amplitude of the signal at amplifier 416 in the multiplier 418 and the low pass filter 420. The low pass filter 420 and multiplier 418 convert the amplitude into a DC voltage to control the gain at the automatic gain control circuit 422. The output of the automatic gain control circuit 422 is a regulated drive signal which is differentially driven into the sensor 414 (identified as sensor 348 in FIG. 3) by amplifier 412 with minimal feedthrough voltage affecting the sensor input.

Thus, the half frequency signal enables a voltage to be input into the sensor, which avoids problems of parasitic drive voltage contaminating the sensed rate signal. By taking advantage of the square law, the drive voltage coupled into the rate signal is at half the frequency of the sensed rate signal, and therefore is easily filtered. In contrast, if a fundamental oscillator is used, the parasitic drive voltage would be undesirably maintained at the fundamental frequency (NRF), and would be indistinguishable from the sensed signal. Whereas, if the motor is driven at half the NRF of the proof masses, the parasitic voltage coupling would also be at half the NRF, while the proof masses vibrate at their NRF. Consequently, the voltage feedthrough would be easily distinguishable and filtered. Sensor embodiments of the present invention allow for accurate rate sensing and measurement with low complexity using inexpensive components. The simple addition of the flip flop 424 converts the fundamental oscillator into a half frequency oscillator. Such simplicity makes the half frequency oscillator itself attractive as a stand alone integrated circuit for CMOS applications.

The half frequency drive eliminates feedthrough at the motor position sense amplifier which is used as the demodulation reference for determining rate and feedthrough at the NRF. The half frequency drive also eliminates feedthrough at the rate pickoff sense amplifier, thereby minimizing any false rate bias which can be substantially larger than the desired full scale rate sense capability. Furthermore, unlike the multiple frequency oscillator described above, spurious tones are eliminated. The half frequency drive contains only tones which are at odd harmonics of half the fundamental frequency.

The half frequency oscillator is also advantageous due to the substantially increased drive efficiency. For example, it has been found that the drive efficiency is approximately twice as great as for the two frequency method. This becomes critical for certain low voltage applications, such as low power, low voltage automobile applications. Of particular concern in instruments of this type is the generation of unwanted tones that can alias down into the passband and cause jumps in the sensed output rate. Since the half frequency oscillator does not generate spurious tones, unwanted frequencies are also not produced.

It will be recognized that other electronic components may be utilized to divide the drive or motor frequency in half. For example, phase lock loops or regenerative oscillators/dividers can accomplish a divide-by-two function. Such methods produce satisfactory results, but may be more complicated than a flip flop as described herein. In addition, it will be recognized that embodiments of the present invention may be applied in other applications as will become apparent to those skilled in the rate sensor art.

The presently disclosed embodiments are to be considered in all respects as illustrative and not restrictive. The scope of the invention should only be limited by the appended claims, rather than the foregoing description, and all changes that come within the meaning and range of equivalency of the claims are, therefore, intended to be embraced therein.

What is claimed is:

1. A system for sensing rotation rate while eliminating drive voltage coupling, the system operable with a drive voltage, wherein parasitic drive voltage attributable to undesirable feedthrough of the drive voltage back into the sensing system is minimized, comprising:

at least one proof mass;

at least one spring coupled to the proof mass, the spring and proof mass assembly being responsive to unique square law characteristics and having an associated natural resonance frequency (NRF);

a plurality of combs electrostatically associated with and coupled to each proof mass;

drive means coupled to the plurality of combs for supplying a drive voltage to the plurality of combs and inducing movement of each proof mass in a plane relative to the associated combs, the drive means having an associated drive motor natural resonance frequency, wherein the arrangement of the proof masses and combs defines a sense axis parallel to the plane in which the proof masses move, further wherein the combs are driven at half the associated NRF in response to the unique square law characteristics of the spring and proof mass assembly;

sensing means for sensing the movement of the proof masses when the rate sensor system is rotated about the sense axis, wherein the movement of the proof masses is defined by deflection of the proof masses relative to the combs; and measurement means for measuring the deflection of the proof masses to determine the rotational rate.

2. The system of claim 1, wherein the drive means comprises:

a comb drive amplifier for driving the plurality of combs, and a half-frequency motor oscillator for driving the plurality of combs at half the NRF, such that no parasitic drive voltage at the NRF is produced.

3. The system of claim 2, wherein the half-frequency motor oscillator includes a flip flop and a filter coupled in series to the flip flop to provide the drive voltage at half the natural resonance frequency.

4. A micromachined rate sensor system for sensing rotation rate, comprising:

at least one proof mass;

a plurality of combs electrostatically associated with and coupled to each proof mass;

excitation means coupled to the plurality of combs for inducing a velocity and measurable motion in each proof mass in a plane relative to the associated combs, the arrangement of the proof masses and combs defining a sense axis parallel to the plane in which the proof masses move and normal to their velocities, wherein the velocity of the proof masses relative to the plurality of combs is associated with a natural resonance frequency (NRF) at which the proof masses and the combs self-oscillate, further wherein the excitation means includes a comb drive amplifier for driving the plurality of combs at a drive voltage, wherein a parasitic drive voltage attributable to undesirable feedthrough of the drive voltage back into the sensor system is produced when the drive voltage is at the NRF, and a half-frequency motor oscillator for driving the plurality of combs at half the: NRF to minimize the parasitic drive voltage;

sensing means for sensing the motion and velocity of the proof masses when the proof mass and associated comb assembly is rotated about the sense axis, wherein the velocity and motion of the proof masses are defined by deflection of the proof masses relative to the combs; and measurement means for measuring the deflection of the proof masses to determine the rotational rate.

5. The system of claim 4, wherein the half-frequency motor oscillator includes a flip flop, and a first filter coupled in series to the flip flop to provide the drive voltage at half the NRF.

6. The system of claim 5, further comprising:

an amplifier for sensing the motion of the proof masses relative to the plurality of combs, and for translating the motion into a voltage which comprises the output of the amplifier, a compensator coupled to the amplifier for providing a phase shift to the amplifier output;

a multiplier coupled to the compensator, the multiplier having an output, a low pass filter coupled to the multiplier for filtering the output of the multiplier, a gain control circuit coupled to the second low pass filter, and having an output which comprises a regulated drive signal, and a driving amplifier which drives the plurality of combs, wherein the output of the resonator compensator is input into the sensor system to determine the rotational rate.

7. The system of claim 6, wherein the flip flop and the first filter have an output, the output being input into the gain control circuit.

8. A method of driving a micromachined gyro rate sensor having a plurality of sense plates electrostatically coupled to associated combs, wherein the sense plates and combs move relative to each other at an inherent natural resonance frequency (NRF) in response to a drive voltage, wherein the method minimizes parasitic drive voltage attributable to undesirable feedthrough of the drive voltage back to the sense plates and combs, the method comprising the steps of:

self-oscillating the sense plates and the combs at their NRF by supplying a voltage to the combs; and driving the combs at half the NRF by superimposing an AC drive voltage via an amplifier and phase shift compensation network over the voltage supplied to the combs, such that minimal parasitic drive voltage is produced at the NRF.

9. A method for sensing rotation rate and position, comprising the steps of:

electrically excited a plurality of proof masses which are electrostatically associated with and coupled to a plurality of combs, wherein the step of electrostatically exciting includes the step of applying a drive voltage to drive the plurality of combs at half a natural resonance frequency (NRF) at which the proof masses and the combs self-oscillate such that no parasitic drive voltage at the NRF, attributable to undesirable feedthrough of the drive voltage back to the plurality of combs, is produced;

inducing movement and a velocity in each proof mass relative to the associated combs, the arrangement of the proof masses and combs defining a sense axis which is parallel to the plane in which the proof masses move and normal to their velocities;

sensing deflections in the motion of the proof masses when the proof masses relative to the associated combs are rotated about the sense axis; and measuring the deflection of the proof masses to determine the rotational rate.

10. The method of claim 9, wherein the step of inducing a velocity in each proof mass relative to the associated combs includes self-oscillating the proof masses and associated combs at their corresponding NRF.

11. The method of claim 9, further comprising the steps of:

coupling a sense amplifier to the proof masses to determine the amount of deflection of the proof masses relative to the associated combs, the sense amplifier having an output, coupling a compensator to the sense amplifier, such that the output of the sense amplifier is input into the compensator, and coupling a flip flop to the compensator to cause a drive voltage to be provided to the proof masses and combs at half the NRF.

12. The method of claim 11, further comprising the steps of:

translating the deflection of the proof masses relative to the combs into a voltage, multiplying the output of the sense amplifier, filtering the multiplied output, and regulating the filtered output via a gain control circuit to produce a regulated drive signal.

* * * * *